United States Patent [19]

MacKay

[11] Patent Number: 5,208,624
[45] Date of Patent: May 4, 1993

[54] CAMERA LENS AND FILTER ADAPTER ASSEMBLY

[75] Inventor: Michael T. MacKay, Vallejo, Calif.

[73] Assignee: Sony Corporation of America, Park Ridge, N.J.

[21] Appl. No.: 775,700

[22] Filed: Oct. 10, 1991

[51] Int. Cl.[5] .............................................. G03B 11/00
[52] U.S. Cl. .................................................... 354/295
[58] Field of Search ................. 354/295, 296, 195.1, 354/195.12

[56] References Cited

U.S. PATENT DOCUMENTS

| | | | |
|---|---|---|---|
| 4,558,936 | 12/1985 | Petersen | 354/86 |
| 4,684,231 | 8/1987 | Athy | 354/295 |
| 4,764,784 | 8/1988 | Torikoshi et al. | 354/195.12 |
| 5,097,280 | 3/1992 | Nomura | 354/295 X |

Primary Examiner—Michael L. Gellner
Assistant Examiner—Howard B. Blankenship
Attorney, Agent, or Firm—Blakely, Sokoloff, Taylor & Zafman

[57] ABSTRACT

An improved camera lens and filter adapter assembly has application for use in video and photographic cameras, and in particular, cameras using filters or special effects equipment. Camera lenses are housed in a helical mount located on the lens and filter adapter assembly and focusing of the lens will not rotate the helical mount in a radial direction. Because of this, filters and special effects devices, such as a polarizing filter or a matte box, which must remain stationary in a radial direction will not be effected during focusing. Filters and special effects devices are magnetically coupled to the lens and filter adapter assembly using magnetic rings. Magnetic coupling provides quick, easy and secure mounting of filters and special effects devices to cameras and permits a camera-person to cascade as many filters or special effects devices as needed.

6 Claims, 3 Drawing Sheets

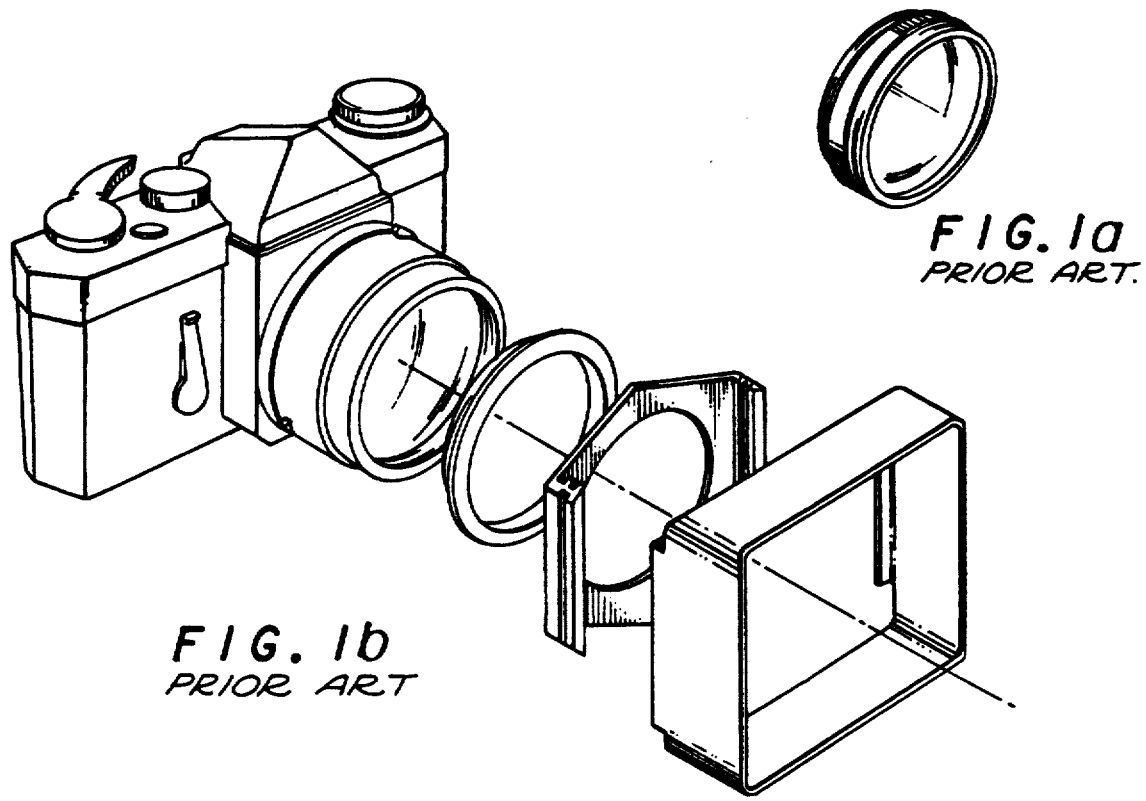
FIG. 1a
PRIOR ART.
FIG. 1b
PRIOR ART
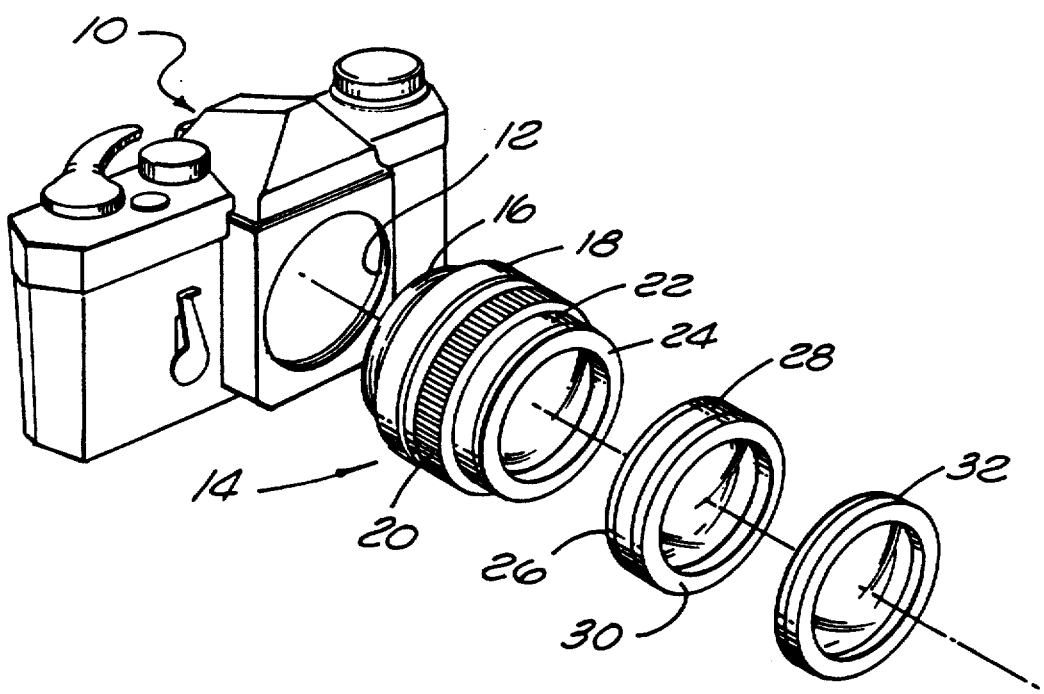
FIG. 2

CAMERA LENS AND FILTER ADAPTER ASSEMBLY

BACKGROUND OF THE INVENTION

1. Field of the Invention

The present invention relates to an apparatus for an improved camera lens and filter adapter assembly, and more particularly, to a camera lens assembly which can focus a camera without rotating filters and special effects devices attached to the lens, and an improved filter adapter assembly which allows for easy placement and removal of additional filters and special effects devices placed on a camera lens.

2. Art Background

Special effects are often created in video and photographic productions using devices attached to the end of a lens of a camera, such as optical filters and matte boxes. For example, various types of color filters may be used to change or enhance a photographic or video image. For example, color correction filters adapt light sources to a particular color film being used. Neutral density filters reduce the light entering the lens and polarizing filters, depending upon the filter's orientation with the sun, reduces glare and light coming into a camera. An effect whereby stars or bursts of light from a light source are created by lines scratched on a glass or plastic filter is called a starburst or lined ruled filter.

Often times, many of these special effect filters and devices are used in conjunction with one another. For example, a polarized filter is used to reduce glare, while a color conversion filter functions to match lighting upon a subject with a particular type of color film used. In addition to the above two filters, a starburst filter may be used to produce stars or bursts of light. As can be seen from the above example, certain video and photographic works require a combination of filters used simultaneously. Furthermore, different combinations of devices are required for different shots and the camera-person or photographer may need to set-up quickly for the next shot.

Currently, there are two methods for mounting lenses and filters to a camera. The most common is a screw thread mount which is illustrated in FIG. 1(a) showing a screw thread mount filter. Screw thread mounts contain small threads on each end of a filter or lens which allow each device to be connected by screwing the devices together. Although this type of mounting renders filters and lenses physically secure to the rest of the camera, it does not provide easy removal and addition of devices. For example, dirt may enter into a thread grove resulting in less than optimal performance of the threads. Also, a co-efficient of expansion for an outer casing material of the lens and filter may cause the device to either contract or expand. Even if the screw thread mounts are not physically deformed or dirty, a user often finds the small threads are difficult to match and screw together properly. Also, cross threading can easily occur permanently damaging the threads and or the grooves. Therefore, the lenses and filters which are screw thread mounted are difficult to add and remove quickly. Because of this, bayonet mounting has been introduced. Unlike the screw thread mount, which will mate to any single lens reflex (SLR) camera regardless of the manufacturer, each manufacturer of the bayonet mount employs a slightly different system which results in incompatible filters and lenses. Therefore, it would be desirable to provide a system of mounting camera external devices which provide stability, easy addition and removal of external camera add-on devices.

An alternative to directly mounting filters with screw threads is to attach the filter to a camera lens with a filter adapter. FIG. 1(b) illustrates a filter adapter consisting of a step up/down ring, a Cokin universal filter holder, and a filter hood. The step up/down ring adapts particular threads of a camera lens to a chosen filter. The Cokin universal filter holder is adaptable to lenses which have a screw thread of 49 mm to 58 mm. The holder will house both square or round filters and more than one filter may be mounted at a time. A lens hood may be attached to the holder to shield the filter and lens from direct sunlight. This configuration is limited because if no filter is needed or a special effects device desired, the entire adapter assembly must be removed. Furthermore, various step up/down rings would be needed to accommodate different lenses used. It would be desirable for the camera-person or photographer to switch the filters quickly and easily. Therefore, it is an objective of this invention to provide a filter and special effects device add-on system where the add-on devices are securely mounted to a camera lens, compatible among different filters and lenses, and easy to remove and add.

In the current operation of a camera lens, when a focus adjustment is made, the entire barrel rotates including any additional filters or special effects devices attached. There are certain filters and special effects devices added on to a lens of a camera which must remain stationary, in a radial direction, to function properly. For example, polarization lenses must remain stationary to obtain the proper effect. An outdoor image taken with a polarized lens which is at a right angle with the sun will provide a darker blue sky and reduce glare than an image taken with a polarized filter not at a right angle with the sun. When superimposed graphical effects are desired, a camera may have a matte box attached to the end of the lens. The matte box blocks parts of a photographed or recorded image and thereby facilitates subsequent superimposing of graphics on the image. When using either polarizing filters or matte boxes in videotaping or photography, focusing presents a problem. It is a further objective of the present invention to provide a focusing lens while still allowing additional devices to remain stationary in a radial direction.

Images sought to be photographed are considered to be in focus when the image's reflection upon the cameras film is sharp and clear. A distance between a camera's lens and film is defined as focal length. In general, cameras are focused by changing the focal length. In whole lens focusing, an entire lens mechanism is shifted toward or away from the film. The actual distance in which the lens may move from the film is dependent upon the type of lens. Although less popular than whole lens focusing, front cell focusing only moves a rear element, the element furtherest from the camera body, toward or away from the lens while a front element is permanently focused upon infinity. Infinity, in this context, refers to a point at least 30 m from the camera.

As will be described in more detail below, a novel and simple solution to the above problems is provided by key alterations to the above described lens apparatus and filter mounting.

SUMMARY OF THE INVENTION

An improved camera lens and filter adapter assembly is disclosed which has application for use in video and photographic cameras, and in particular, cameras using filters and special effects equipment. The camera lens and filter adapter assembly attaches to existing cameras through a screw thread mount. Filters and special effects devices, or external camera add-on devices, may be attached to the end of the lens and filter adapter by magnetic coupling. A magnetic ring located on the end of the camera lens and filter adapter assembly provides a mount for add-on devices. Each external camera add-on device has magnetic rings located on both ends of the respective device whereby the ends are magnetically polarized in opposite directions. External camera add-on devices are mounted to the camera lens and filter adapter assembly by placing the magnetic ring of the add-on device in close proximity to the magnetic ring of the camera lens and filter adapter assembly. This system provides quick, easy and secure mounting of add-on devices and allows a photographer to cascade as many add-on devices as needed. The lens and filter adapter assembly also consists of a skylight filter to shield ultra violet radiation thereby reducing glare and protecting the camera lens.

In the camera lens and filter adapter assembly, focusing is accomplished without rotating filters and special effects devices attached to the end of the assembly. Lenses are housed within a helical mount, and during focusing the helical mount remains stationary in a radial direction while moving in a forward and aft direction. A manual focusing ring, located on the camera lens and filter adapter assembly, rotates to move the helical mount causing a change in focal length. Consequently, external devices which must remain stationary in the radial direction, such as a matte box or a polarized filter attached to the camera lens and filter adapter assembly, will remain stationary in the radial direction during focusing.

BRIEF DESCRIPTION OF THE DRAWINGS

The objects, features and advantages of the present invention will be apparent from the following detailed description in which:

FIG. 1(a) illustrates a prior art screw thread mounted filter.

FIG. 1(b) illustrates a prior art filter adaptation assembly.

FIG. 2 illustrates the present invention of an improved camera lens and filter adapter assembly, additional filters, and a standard SLR camera.

DETAILED DESCRIPTION OF THE INVENTION

Figure 3:
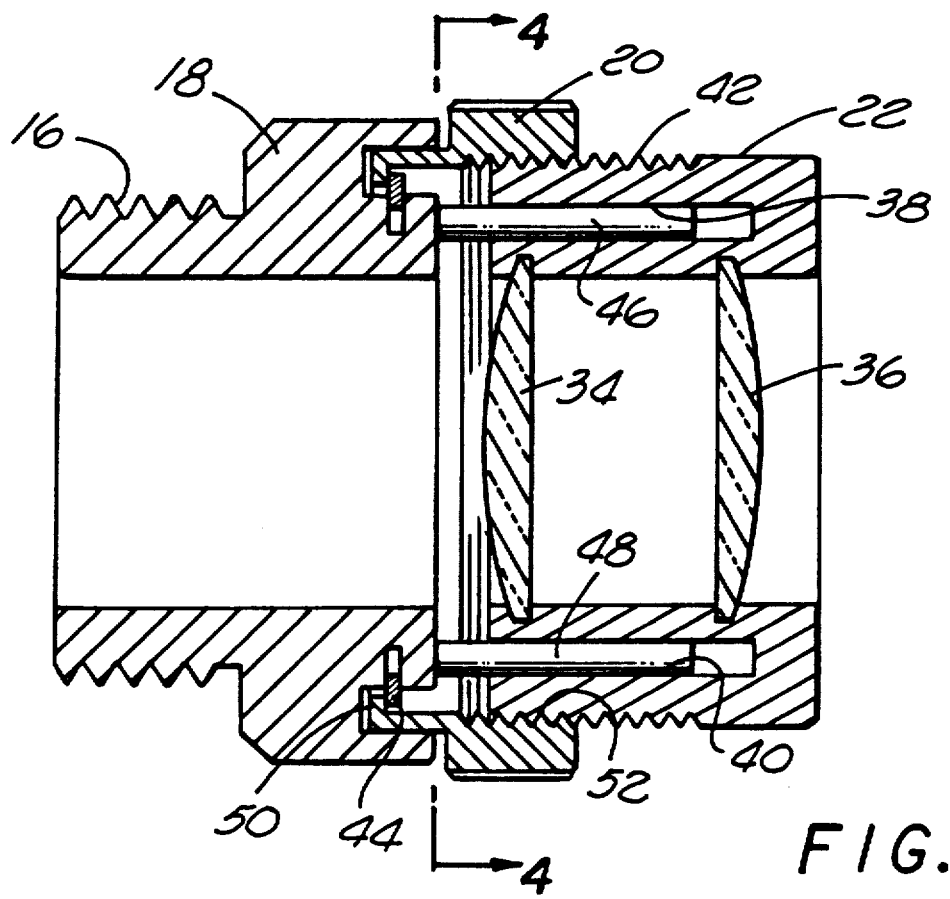
FIG. 3 illustrates a cross sectional view of a camera lens assembly of the present invention.

An improved camera lens and filter adapter assembly is disclosed. In the following description, for purposes of explanation, specific nomenclature is set forth to provide a thorough understanding of the present invention. However, it will be apparent to one skilled in the art that these specific details are not required in order to practise the present invention. In other instances, well known circuits and devices are shown in block diagram form in order not to obscure the present invention unnecessarily.

The preferred embodiment of the improved camera lens and filter adapter assembly of the present invention is illustrated in FIG. 2. The camera lens and filter adapter assembly 14 attaches to a standard SLR camera 10 by screw thread mounting such that lens mount 16 screws into screw thread 12. Base barrel 18, located on the improved camera lens and filter adapter assembly 14 remains stationary with respect to the camera during focusing. Helical mount 22 houses optical lenses for camera operation. Manual focusing ring 20 has the same diameter as base barrel 18. Helical mount 22 is recessed within base barrel 18 and manual focusing ring 20. When focusing, helical mount 22 moves forward and aft within base barrel 18, and manual focusing ring 20 moves radially around helical mount 22 as will be explained in more detail below. By rotating manual focusing ring 20 in a counterclockwise direction, helical mount 22 is brought forward and the focal length is made longer. Conversely, helical mount 22 is retracted by rotation of manual focusing ring 20 in the clockwise direction.

Still referring to FIG. 2, adapter magnetic ring mount 24 is disposed on camera lens and filter adapter assembly 14. Mounting magnetic ring mount 26, located on filter 28, also has a magnetic ring, however, the mounting magnetic ring 26 is polarized in an opposite direction. Therefore, filter 28 may be added to camera lens and filter adapter assembly 14 by simply placing mounting magnetic ring 26 in close proximity to adapter magnetic ring 24. Because adapter magnetic ring 24 and mounting magnetic ring 26 are magnetically polarized in opposite directions, as will be described, filter 28 and camera lens and filter adapter 26 are magnetically coupled together. Although the mounting magnetic rings in FIG. 2 are shown to be cylindrical in shape and having a circular parameter, it will be appreciated to one skilled in the art that the shape of the magnetic mount is not limited to a cylindrical shape. For example, an external camera device having a rectangular end would contain a mounting magnetic device having a rectangular parameter. An additional filter, such as filter 32, may be added to camera lens and filter adapter assembly 14. In a similar manner, additional filters may be added as desired. The magnetic mounting of filters to camera lens and filter adapter assembly 14 allows for easy removal by simply pulling on the filter to be removed to overcome the magnetic coupling force.

It will be noted that in single lens reflex cameras with interchangeable filters, an aperture is commonly located within the lens assembly. In the preferred embodiment, an aperture is not shown as part of the camera lens and filter adapter assembly because it is not necessary for a thorough understanding of the present invention. However, it will be appreciated that any standard type of aperture could be mounted in base barrel 18, and this addition would be apparent to one skilled in the art.

Referring to FIG. 3, a cross-sectional view is illustrated for helical mount 22 of the present invention. Lens elements 34 and 36 form a simple symmetrical pair of meniscus lenses. Although the meniscus lens pair make up a simple camera lens configuration, other more complex lenses, consisting of multiple pairs of lenses could be mounted in helical mount 22. For example, macro and telephoto lenses consist of multiple pairs of lenses. Although the invention has been described in conjunction with a pair of symmetrical meniscus lenses, numerous alternatives, variations, modifications to a helical mount containing a more complex lens configuration will be apparent to those skilled in the art in light of the foregoing description.

Figure 4:
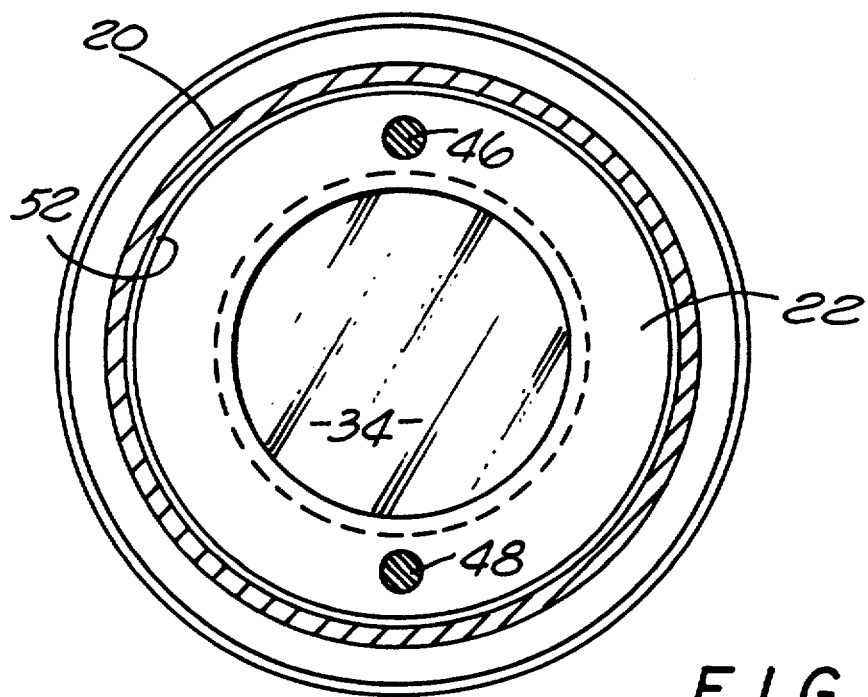
FIG. 4 illustrates a back view of a helical mount of the present invention.

The back view of helical mount 22 is illustrated in FIG. 4. A forward and aft direction, with respect to the SLR camera body, is the only direction in which helical mount 22 is free to move. Motion in the radial direction is retained by rods 46 and 48, located on base barrel 18. Retaining rods 46 and 48 are recessed in notches 38 and 40 located on helical mount 22. Referring now to FIG. 3, male threads 42 are located on helical mount 22 to transfer the radial force exerted upon manual focusing ring 20 in the forward and aft direction. In the preferred embodiment of the present invention, whole lens focusing is disclosed. Although both lens elements 34 and 36 move in the focusing of lens and filter adapter assembly 14, conversion to front cell focusing, whereby only lens element 36 would be housed within helical mount 22, would be known to one who is skilled in the art.

A detailed drawing of base barrel 18 is also illustrated in FIG. 3. Referring now to FIG. 3, retaining ring 44 provides a stop in which tongue 50 on manual focusing ring 20 prohibits helical mount 22 from moving away from base barrel 18. Retaining ring 44 and tongue 50 mechanism allows manual focusing ring 20 to freely rotate in a radial direction. Manual focusing ring 20 may not move in a forward and aft direction. Retaining rods 46 and 48, located on base barrel 18, and notches 38 and 40 located on helical mount 22, restrain helical mount 22 from rotating in a radial direction as described in the preceding paragraph. Furthermore, as illustrated in FIG. 3, female threads 52 provide a mate for the male threads of helical mount 22 and translate a rotational force from manual focusing ring 20 to move helical mount 22 in a forward and aft direction.

Figure 5:
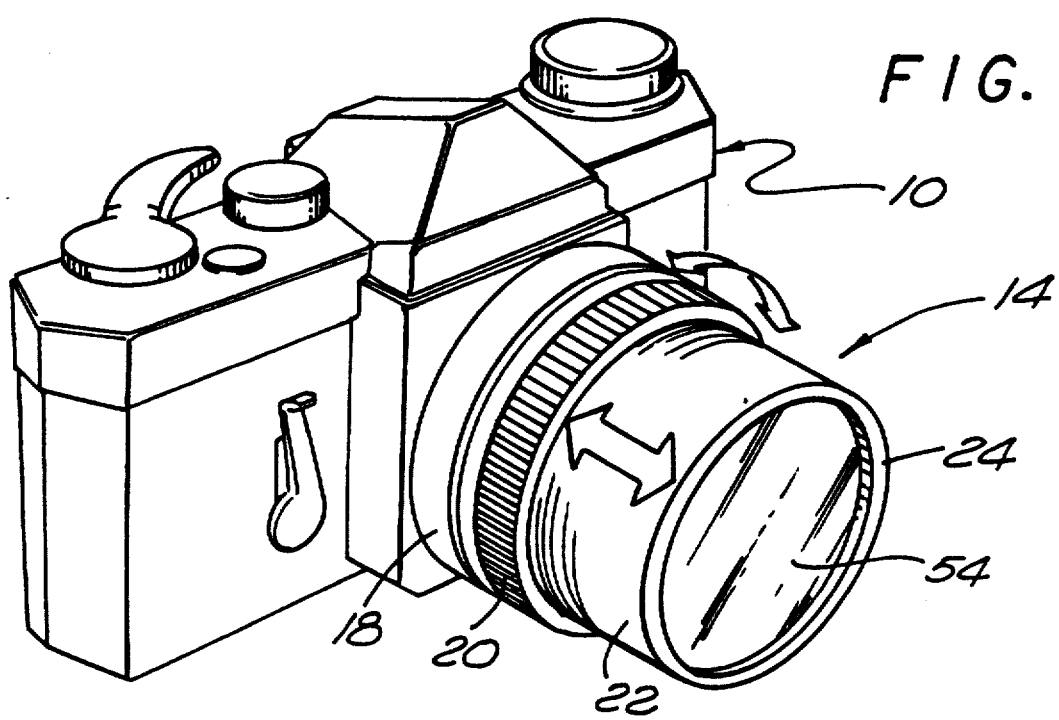
FIG. 5 illustrates a front prospective view of the improved camera lens and filter adapter assembly.

The camera lens and filter adapter assembly 14 is illustrated in FIG. 5. In operation, when a camera-person wishes to focus the lens, manual focusing ring 20 is rotated in either a clockwise or counterclockwise direction. A clockwise rotation of manual focusing ring 20 causes helical mount 22 to move in an aft direction or toward SLR camera 10, and a counterclockwise rotation causes helical mount 22 to move away from SLR camera 10. Movement of helical mount 22, in either the forward or aft direction, causes a change in focal length thereby permitting a camera-person to focus an image upon photosensitive film located in SLR camera 10. As manual focusing ring 20 is rotated, female thread screw 52 on manual focusing ring 20 causes male screw thread 42 on helical mount 22 to exert a force in a forward or aft direction. Because helical mount 22 does not rotate, a polarized filter or a matte box may be attached to helical mount 22 and focusing of lens elements 34 and 36 will not effect the radial position in which special effects devices are mounted.

In the preferred embodiment, camera lens and filter adapter assembly 14 contains skylight filter 54 as illustrated in FIG. 5. The primary purpose for skylight filters are to reduce haze and excess glaze by filtering out ultraviolet radiation. Skylight filters are often left on camera lenses all the time to help reduce scratches and thereby protect the lenses. Because of this, camera lens and filter adapter assembly 14 is beneficial even if no additional special effects devices are added to the assembly.

Figure 6:
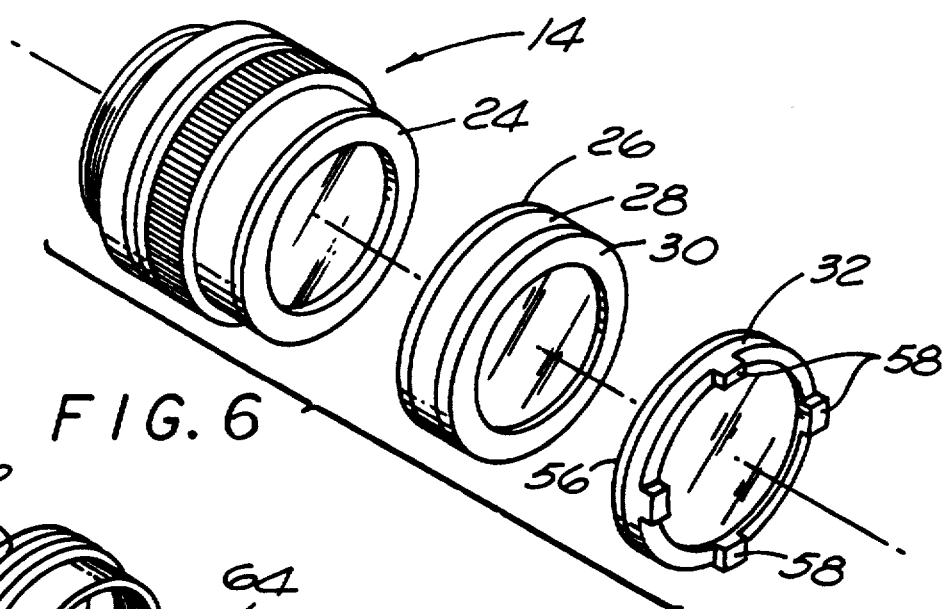
FIG. 6 illustrates a front prospective view of filters adapted to the present invention.

FIG. 6 illustrates external camera add-on filters 28 and 32 to SLR camera 10 and improved camera lens and filter adapter assembly 14. Filter adapter magnetic ring 24 provides a means to magnetically couple a plurality of additional filters to a SLR camera. Although a magnetic ring which covers the entire perimeter of the external camera device is illustrated in the preferred embodiment, it will be appreciated that less than a full magnetic ring would be required to attach other external camera devices. For example, magnetic mount 58 on filter 32 has hour segmented pieces of magnetic material for the magnetic mount. Similarly, a variety of magnetic mount arrangements would be apparent to one skilled in the art. Adapter magnetic ring 24 is polarized such that a magnetic field emanates from adapter magnetic ring 24 in a plane perpendicular to the front surface. The magnetic field is directed away from the front surface. Front mounting magnetic ring 35 located on filter 28 is polarized in the opposite direction than adapter magnetic ring 24, to cause magnetic fields from mounting magnetic ring 35 and adapter magnetic ring 24 to attract. In a similar manner, rear mounting magnetic ring 30 located on filter 28 is polarized in an opposite direction from the polarization of front mounting magnetic ring 56 located on filter 32. Because all filters and special effects devices in the preferred embodiment have similar magnetically polarized mounting rings in the front and similarly polarized mounting rings in the back of the device, as many additional devices may be added to the improved camera lens and filter adapter assembly as desired.

In the preferred embodiment, Samarium Cobalt is the magnetic metal used for all magnetic rings but any rare earth metal exhibiting similar ferromagnetism characteristics could be used. Samarium Cobalt, as employed in the present invention, provides magnetic coupling strong enough to bond filters and special effects devices to a camera yet not so strong as to allow the devices to be pulled apart by a minimum amount of human force. The size of the Samarium Cobalt magnetic ring, providing the coupling characteristics described above, is small enough to attach to an end of a filter, filter adapter or special effects device without changing the size of the devices. Furthermore, filter adapter magnetic ring 24 and all mounting magnetic rings located on filters 28 and 32 are physically attached such that the rings will not block the optical path of lens elements 34 and 36.

Figure 7:
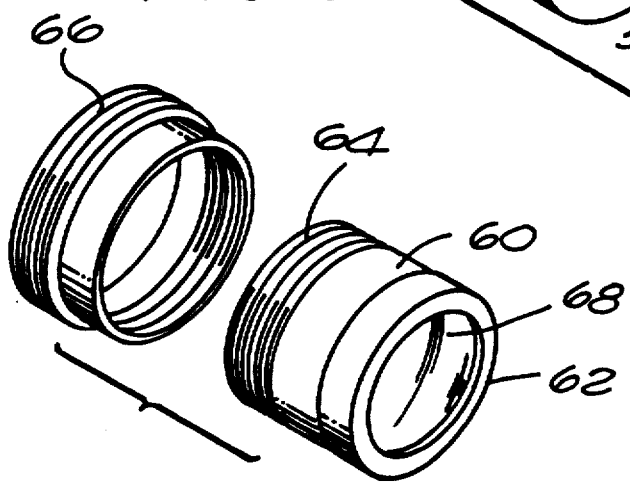
FIG. 7 illustrates a stand alone filter adapter of the present invention.

A stand alone filter adapter assembly is illustrated in FIG. 7. Stand alone filter adapter assembly 60 contains screw thread mount 64 on an end of the adaptor which allows for mounting on a standard 50 mm lens. Step-up/down ring 66 could adapt a non-standard lens size to filter adaptor 60. Filter adapter 60 contains adapter magnetic ring 62 which provides a mount for filters and special effects devices. In a similar way additional filters are added to camera lens and filter adapter assembly 14, filters and special effects devices are added to filter adaptor 60 by placing the mounting magnetic ring on the additional device in close proximity with filter adapter magnetic ring 62. Filter adapter 60 provides a means for addition and retraction of special effects devices and filters quickly while maintaining a secure mount for those devices. Furthermore, filter adapter 60 consists of skylight filter 68 which protects the lens of a camera and reduces glare in photographs and video tapes. Because of the ultra violet radiation protection in skylight filter 68, the use of filter adapter 60 is beneficial even without the additional filters or special effects devices.

Although the invention has been described in conjunction with the preferred embodiment, numerous alternatives, variations, modifications and uses will be apparent to those skilled in the art in light of the foregoing description.

The foregoing has described an improved camera lens and filter adapter assembly. It is contemplated that changes and modifications may be made by one of ordinary skill in the art, to the materials and arrangements of elements of the present invention without departing from the spirit and scope of the invention.

I claim:

1. A magnetic mount for mounting external camera add-on devices to a camera lens assembly, said magnetic mount comprising:

an adapter magnetic ring having an outer perimeter, an inner perimeter, a device mount surface and a camera mount surface, said camera mount surface of said adapter magnetic ring being coupled to said camera lens assembly, said adapter magnetic ring being magnetically polarized such that a magnetic field emanates away from said adapter magnetic ring in a plane perpendicular to said device mount surface; and a plurality of add-on devices each having a front mounting magnetic ring and a rear mounting magnetic ring, said front and rear magnetic mounting rings having an outer diameter and an inner diameter, said outer perimeter of said adapter magnetic ring being equal to said outer diameter of said mounting magnetic rings, said inner perimeter of said adapter magnetic ring being equal to said inner diameter of said mounting magnetic rings, said front mounting magnetic ring being magnetically polarized in an opposite direction than said adapter magnetic ring and said rear magnetic ring being magnetically polarized in the same direction as said adapter magnetic ring such that said add-on devices are magnetically coupled to said camera lens assembly when said add-on devices are placed in proximity to said camera lens assembly;

said camera lens assembly comprising:

standard connection means for coupling said camera lens assembly to a camera body;

a plurality of lens elements;

a helical mount having an outer shell, an inner shell, and an optical path defined through said plurality of lens elements by a hole bounded by said inner shell of said helical mount;

helical mount connection means for mounting said helical mount to said camera lens assembly;

a manual focusing ring; and non-rotational focusing means for focusing said camera lens assembly such that rotation of said manual focusing ring moves said helical mount in a forward and aft direction with respect to said camera body such that said helical mount and said plurality of add-on devices will not rotate.

2. A camera lens assembly as set forth in claim 1 wherein said standard connection means for coupling said camera lens assembly to a camera body is a screw thread mount.

3. A camera lens assembly as set forth in claim 1 wherein said helical mount further comprises of a skylight filter, said skylight filter being recessed within said helical mount and said filter eliminates ultra-violet radiation from electromagnetic energy passing through said optical path.

4. A camera lens assembly as set forth in claim 1 wherein said helical mount connection means comprises of a base barrel having an outer barrel, an inner barrel, said helical mount being recessed within said base barrel such that said outer shell of said helical mount is slightly smaller than said inner barrel of said base barrel.

5. A camera lens assembly as set forth in claim 4 wherein said non-rotational lens focusing means comprises of said manual focusing ring having an outer casing, an inner casing, and male threads coupled to said inner casing of said manual focusing ring, said outer casing diameter of said manual focusing ring being equal to said outer barrel of said base barrel, said helical mount having female threads being mated with said male threads of said manual focusing ring such that manual rotation of said manual focusing ring in a clockwise direction causes said helical mount to move toward said camera body and manual rotation of said manual focusing ring in a counter clockwise direction causes said helical mount to move away from said camera body.

6. A camera lens assembly as set forth in claim 5 wherein said non-rotaional lens focusing means further comprises of a pair of retaining rods, a retaining ring, a pair of notches and a tongue, said retaining rods being coupled to said inner barrel of said base barrel and said notches being coupled on said outer shell of said helical mount, said retaining rods being recessed into said notches such that said helical mount is restricted from moving in a radial direction, said tongue being coupled to an end of said manual focusing ring between said outer casing and said inner casing and said retaining ring being coupled to an end of said base barrel between said outer barrel and said inner barrel, said tongue being recessed into said retaining ring such that said manual focusing ring is restricted from movement in a forward and aft direction with respect to said camera body.

* * * * *